Nov. 18, 1969   J. R. FALCONE ET AL   3,478,722
PURPLE MARTIN BIRD HOUSE
Filed Dec. 1, 1967   4 Sheets-Sheet 1
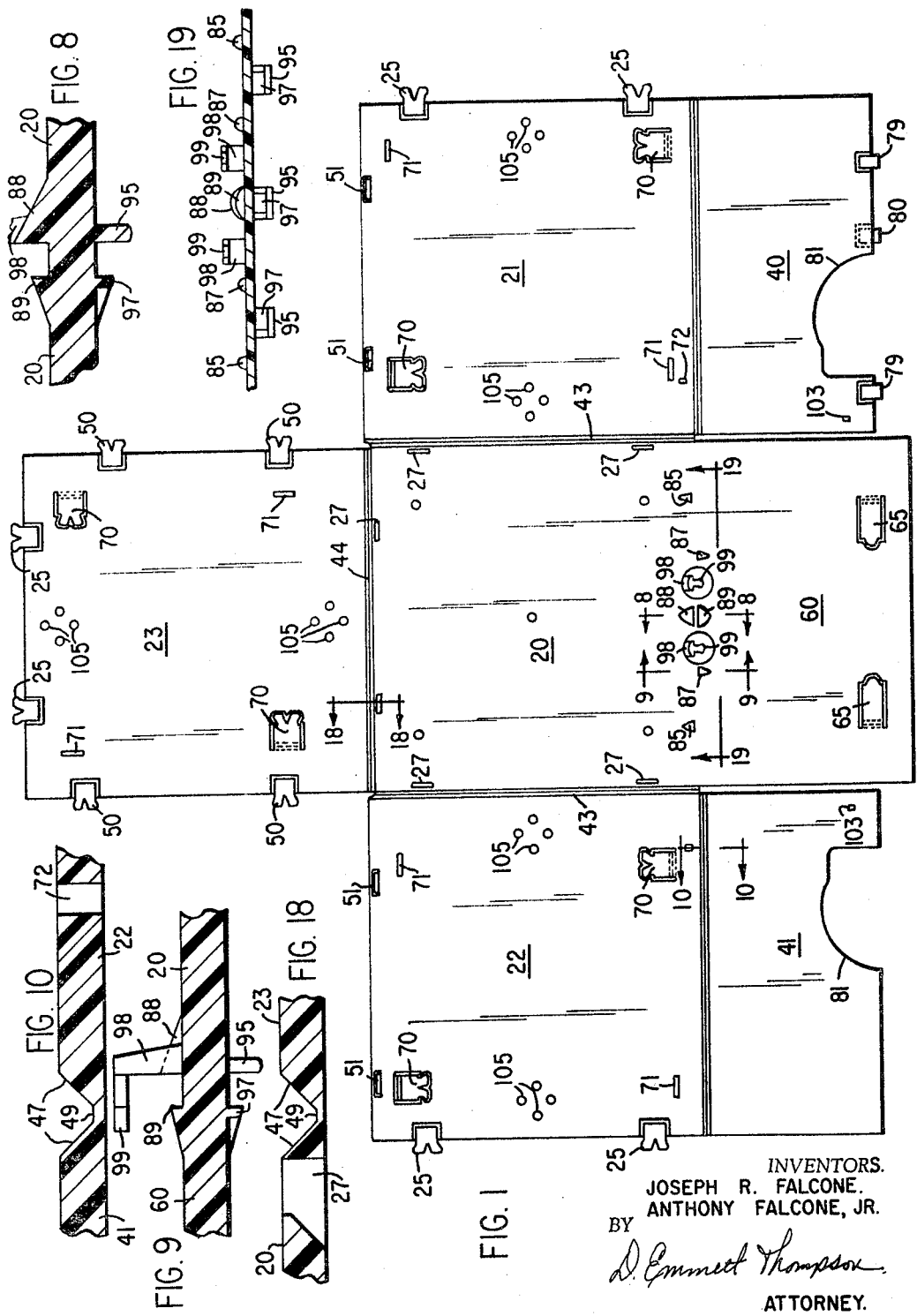
INVENTORS.
JOSEPH R. FALCONE.
ANTHONY FALCONE, JR.
BY
D. Emmett Thompson
ATTORNEY.

Nov. 18, 1969   J. R. FALCONE ET AL   3,478,722
PURPLE MARTIN BIRD HOUSE
Filed Dec. 1, 1967   4 Sheets-Sheet 2
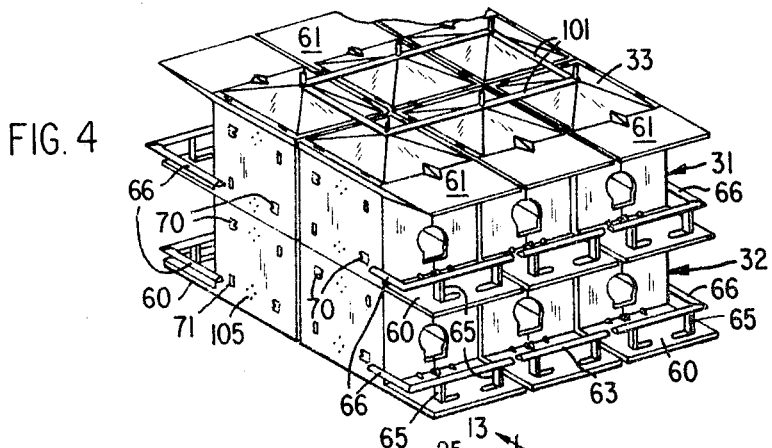
FIG. 4
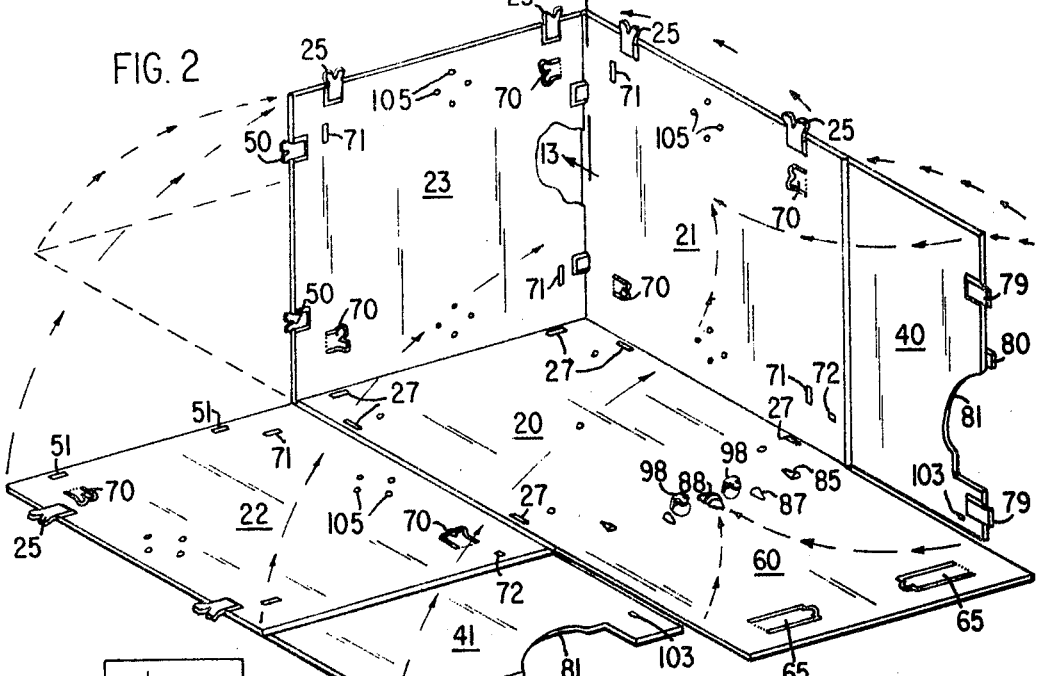
FIG. 2
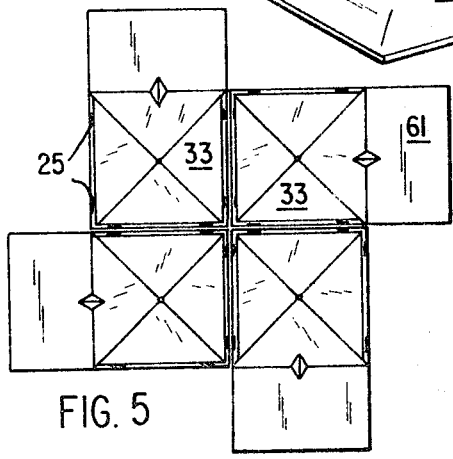
FIG. 5
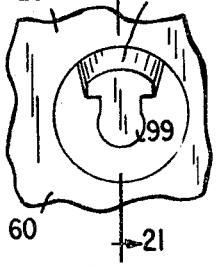
FIG. 20
FIG. 21
INVENTORS.
JOSEPH R. FALCONE.
ANTHONY FALCONE, JR.
BY
D. Emmett Thompson
ATTORNEY.

Nov. 18, 1969   J. R. FALCONE ET AL   3,478,722
PURPLE MARTIN BIRD HOUSE
Filed Dec. 1, 1967   4 Sheets-Sheet 3
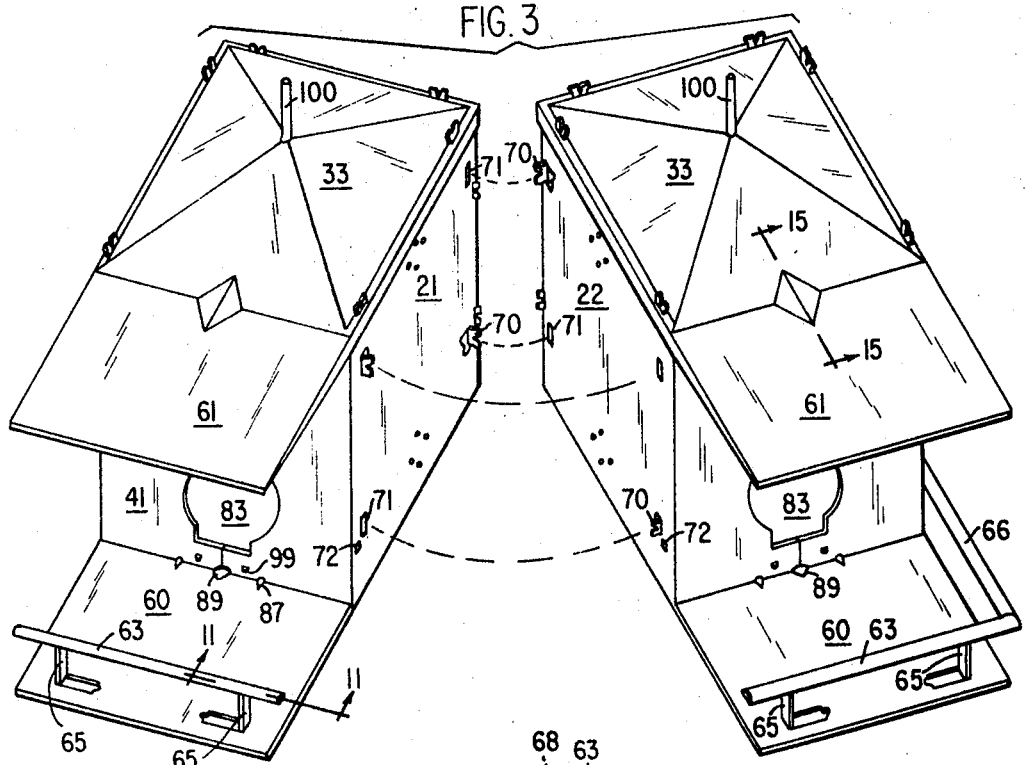
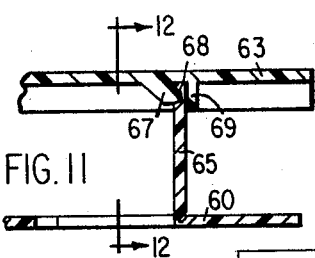
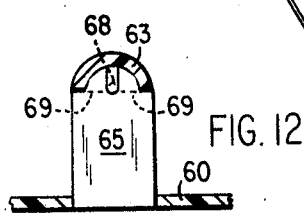
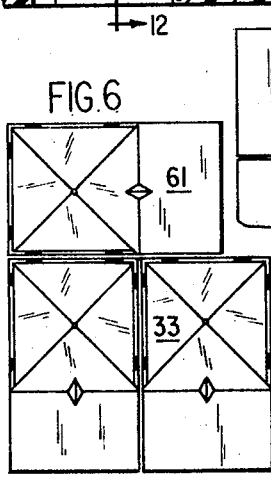
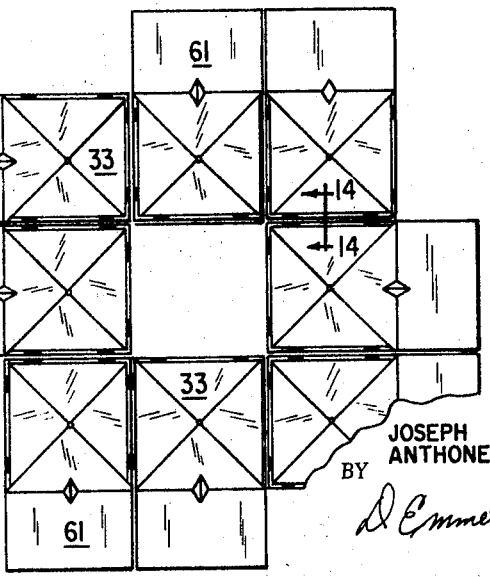
INVENTORS.
JOSEPH R. FALCONE.
ANTHONEY FALCONE, JR.
BY
D. Emmett Thompson
ATTORNEY.

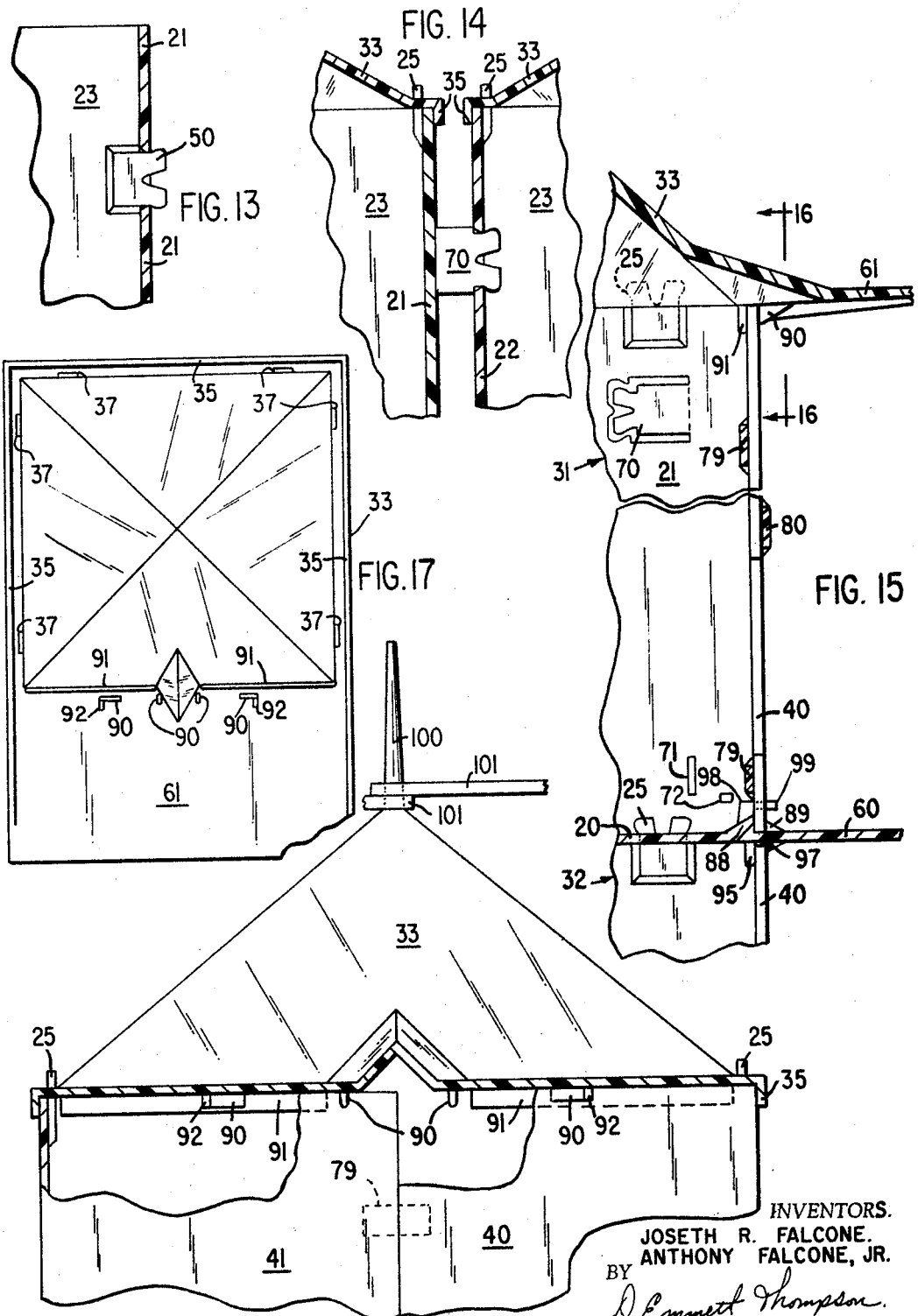

United States Patent Office 3,478,722
Patented Nov. 18, 1969

3,478,722
PURPLE MARTIN BIRD HOUSE
Joseph R. Falcone, 217 Cooper Lane, Dewitt, N.Y., and Anthony Falcone, Jr., 207 Oakridge Drive, Camillus, N.Y. 13031
Filed Dec. 1, 1967, Ser. No. 687,196
Int. Cl. A01k 31/12
U.S. Cl. 119—23      20 Claims

ABSTRACT OF THE DISCLOSURE

A bird house apartment structure. A plurality of apartments may be joined together in side by side, end to end, or end to side, relation, and in vertical stack formation to provide multiple apartment dwellings of various arrangements. The apartments are joined together in spaced relation to provide proper ventilation. Each compartment may be erected from a one-piece, substantially flat blank, with roof and perch.

BACKGROUND OF THE INVENTION

Most people like most kinds of birds, and to encourage the presence of birds, the erection of bird houses by property owners has become popular. It is, in fact, beneficial to encourage certain birds to congregate in numbers. This is particularly true in regard to purple martins because of the fact that they consume a great number of insects, such as mosquitos. In fact, many municipalities suggest that property owners take steps to encourage the purple martins to collect in numbers to reduce insect concentration, and eliminate health hazards resulting from the use of spray insecticides. The purple martins prefer to dwell in colonies inhabiting multiple apartment dwellings.

Often the property owner fabricates a bird house to his own liking, and there are many types and forms of bird houses that can be purchased on the open market, including the multiple dwelling type. However, bird houses generally, including the multiple dwelling type, now available, are erected from a myriad of separate pieces secured together by fasteners by use of tools. Accordingly, such multiple dwelling bird houses are expensive and require the consumption of appreciable time for their erection.

BRIEF SUMMARY OF THE INVENTION

Our invention has to do with a bird house apartment structure embodying a novel arrangement whereby a plurality of separate apartments can be quickly and conveniently erected and joined together to form a multiple apartment bird house dwelling of many different configurations. The individual apartments may be jointed together in side by side, end to end, or side to end relation and in vertical stack formation, whereby multiple dwellings of many different arrangements and configurations can be fabricated. The individual apartments are joined together in such manner that the side and end walls of each apartment are arranged in spaced relation to the side and end wall of each of the other apartments, and the walls are formed with apertures to provide adequate ventilation for each apartment.

The invention has as a further object a bird house apartment structure which can be produced at nominal cost. The main portion of the structure is erected from a substantially flat blank of plastic material. The arrangement is such that the apartments can be erected and including a roof and perch, without the use of any tools, or separate fasteners.

BRIEF DESCRIPTION OF DRAWINGS

FIGURE 1 is a plan view of a flat blank from which an apartment is erected.

FIGURE 2 is a view, in perspective, showing the rear wall and a side wall in folded and locked position.

FIGURE 3 is a view, in perspective, of two erected compartments positioned to be joined in side by side relation.

FIGURE 4 is a view, in perspective, of twelve compartments assembled into a multiple dwelling.

FIGURES 5, 6 and 7 are top plan views illustrating various ways in which the apartments can be assembled in different multiple dwelling arrangements.

FIGURE 8 is an enlarged, sectional view taken on line 8—8, FIGURE 1.

FIGURE 9 is an enlarged, sectional view taken on line 9—9, FIGURE 1.

FIGURE 10 is an enlarged, sectional view taken on line 10—10, FIGURE 1.

FIGURE 11 is an enlarged view taken on line 11—11, FIGURE 3.

FIGURE 12 is an enlarged, sectional view taken on line 12—12, FIGURE 11.

FIGURE 13 is an enlarged, sectional view taken on line 13—13, FIGURE 2.

FIGURE 14 is an enlarged, sectional view taken on line 14—14, FIGURE 7.

FIGURE 15 is a sectional view taken on line 15—15, FIGURE 3.

FIGURE 16 is a sectional view taken on a line corresponding to line 16—16, FIGURE 15.

FIGURE 17 is a bottom plan view of the roof member.

FIGURE 18 is an enlarged sectional view taken on line 18—18, FIGURE 1.

FIGURE 19 is a view taken on line 19—19, FIGURE 1.

FIGURE 20 is an enlarged plan view of one of the interlocking door closure tabs.

FIGURE 21 is a view taken on line 21—21, FIGURE 20.

DETAILED DESCRIPTION

An erected apartment includes a bottom wall 20, side walls 21, 22, and a rear wall 23. The side walls 21, 22, are formed with tabs 25 extending upwardly from the upper edges of the side walls. The bottom wall 20 is formed with apertures, or slots, 27 arranged complemental to the tabs 25. The tabs 25 and slots 27 provide means for detachably securing apartments together when arranged in vertical stack formation as indicated, for example, by the apartments 31, 32, in FIGURE 4. Preferably, the rear wall is also formed with tabs 25, and the bottom wall 20 also has apertures 27 adjacent its rear edge.

A roof member 33 is adapted to be positioned on the side and rear walls of an erected apartment. The roof members 33 are formed along their rear and side edges with depending flanges 35 which overlap the side walls 21, 22, and the rear wall 23. The roof members 33 are formed with apertures 37, like the apertures 27, and are also arranged complemental to the tabs 25, whereby the tabs extend through the slots 37 and serve to detachably secure the roof to the compartment.

In the preferred form, as shown, the bottom wall 20, side walls 21, 22, and rear wall 23, and also door closure panels 40, 41, are all formed from a one-piece, substantially flat blank molded of plastic material. The side walls 21, 22, are joined to the side edges of the bottom wall by integral hinge joints 43. The rear wall 23 is also joined to the bottom wall by an integral joint 44. These hinge joints are formed, as shown in FIGURE 10, consisting of a V groove having side walls 47 extending at 45° angles, and a bottom wall 49 located in proximity to the opposite side of the blank, providing a thin, flexible area permitting one wall to be moved normal to the contiguous wall. This arrangement permits the side walls and end walls to be folded upwardly normal to the bottom wall, as illustrated in FIGURE 2. These walls may be secured in folded position, as by means of tabs 50 formed on the side edges of the rear wall 23, the tabs 50 entering slots 51 formed in the side walls along the rear edges thereof.

The side walls 21, 22, and rear wall 23, are preferably of like dimension whereby, when these walls are folded vertically to the bottom wall 20, the apartment is of cubical form. The preference for the cubical form, together with the structural arrangement involved, permits the individual apartments to be joined together in side by side, end to end, or end to side relationship, as will be hereinafter explained, in order to form multiple apartment dwellings of many configurations.

Each apartment is provided with a forwardly extending porch floor or area 60. Again, to maintain production costs at a minimum, the porch area 60 is preferably formed integral with the bottom wall 20. The roof 33 is formed with a forwardly extending portion 61 overhanging the porch area 60. When the apartments are arranged in vertical stack formation to provide a multi-apartment dwelling, it will be apparent that only the top apartments are provided with roofs. The porch areas 60 provide an overhanging roof portion for the porch area of the apartment immediately below. Each apartment is also provided with a perch 63 in the form of a rail detachably mounted on the porch area. In the arrangement shown, the porch areas 60 are formed with tabs 65 which are joined at one end by an integral hinge joint to the porch floor 60, see FIGURE 1. The perch rail 63 is semi-circular in cross section, and is formed with a depending member 67, the lower end of which is formed with a spherical projection 68. The rail is also formed on its inner side with cross members 69 arranged in spaced relation to the projections 68. The upper end of the tab 65 is shaped complemental to the under concave surface of the rail and is formed with a recess to receive the projection 68, when the upwardly folded tabs are inserted between the member 67 and the walls 69, see FIGURES 11 and 12. With this arrangement, with the tab 65 folded upwardly from the plane of the porch floor, the rail 63 is snapped onto the upper ends of the tabs. The perch rails 63 are formed linear, as shown at the left in FIGURE 3, and at the center in FIGURE 4. For end apartments, as shown in FIGURE 4, the rails 63 are formed with rearwardly extending portions 66 for perches attached to the apartments at the right end of a multiple dwelling, and with similar rearwardly extending portions 66 for perches attached to apartments at the left side of a multiple dwelling, as shown in FIGURE 4. The ends of the rearwardly extending rail portions 66 are formed with lugs, or tabs, for insertion in apertures 72 formed in the side walls 21, 22. In other words, for corner apartments in a multi-apartment dwelling, the perch rails are formed right and left-hand, and the side walls 21, 22, are formed with the apertures 72 for attachment of the right and left hand perches.

The apartments are erected in such manner that they may be arranged and secured together in side by side, or back to back, or back to side, relation.

The individual apartments may be joined together by various means. However, again to maintain the production cost at a minimum and to reduce the number of separate pieces, the side walls 21, 22, and rear wall 23, are formed with tabs 70, integral with the blank and connected thereto by a hinged joint. The side walls 21, 22, and the rear wall 23, are also formed with slots 71. The tabs 70 are folded outwardly from the plane of the walls in manner similar to the perch tabs 65, and form projections extending outwardly from the side and rear walls.

It will be observed, referring to FIGURE 1, that the tabs 70 and slots 71 are arranged symmetrically and in such manner that the tabs 70 in one wall panel are located in registration with the apertures 71 in the opposite side wall. For example, there is a tab 70 in the upper forward corner of the side wall 21. There is an aperture 71 located in the upper forward corner of the side wall 22. In other words, the tabs 70 are located in diagonal corner areas in each side and rear wall, and the slots 71 are located in the opposite diagonal corner areas. Accordingly, when a pair of apartments are arranged in side by side relation, see FIGURE 3, the projecting tabs 70 on a wall 22 will enter the slots 71 in the side wall 21 of the adjacent apartment. Therefore, as the apartments are compressed toward each other, the tabs 70 and slots 71 interlock and function as means for detachably connecting two apartments together.

It will be noted, referring to FIGURE 14, that the tabs 70 are of sufficient length to position adjacent apartments in spaced apart relation, and this is true regardless of the configuration of the multiple dwelling.

It will be apparent that the same situation prevails when the rear wall of an apartment is moved against the rear wall of an adjacent apartment. Also, when the rear wall of an apartment is moved against the side wall of an adjacent apartment. This because of the cubical form of the apartments, the sides 21, 22, and rear wall 23, being all of like dimension, and with the tabs 70 and the slots 71 arranged symmetrically. The result is that a number of apartments can be quickly and conveniently assembled into a mulitple dwelling having many configurations, some of which are illustrated in FIGURES 4, 5, 6 and 7. Also, by means of the tabs 25 and slots 27, apartments may be assembled in stack formation to make a multi-floor dwelling, as illustrated in FIGURE 4.

The door closure may be of various forms and may consist on one or more pieces. In the arrangement shown, the door closure consists of a pair of panels 40, 41, previously referred to, and which are connected by the integral hinge joint to the front edges of the side walls 21, 22. These panels are foldable inwardly across the porch floor 60. One or both of the panels may be formed with tabs 79, 80, at their free edges, which serve as means to interlock the panels and maintain them in aligned position. Each of the panels 40 is formed with a cut-out 81 to form an ingress and exit opening 83.

The bottom wall 20 is formed with small stop projections 85 against which the lower edges of the door closure abut when in closed position. The floor wall is also formed with projections 87 arranged outwardly from the stop projections 85 a distance equal to the thickness of the door closure panels 40, 41. The outer upper surfaces of the projections 87 incline forwardly and downwardly to form ramps over which the lower edges of the panels ride into position between the stops 85 and projections 87, see FIGURE 15. At the center of the bottom wall 20, there are inner and outer stops 88, 89, positioned correspondingly to the stops 85, 87. In like manner, the under side of the flat roof surface 61 is formed with outer projections 90, and with ribs 91 spaced inwardly from the projections 90 and forming stop members for the upper edges of the panels 40. There are ramps 92 positioned at the outer ends of the outer projections 90 to assist in moving the upper edges of the doors over the stops 90.

The bottom wall 20 is also formed on its under surface with stops 95, 97, see FIGURE 15, which serve to secure the upper edges of closure panels 40 when the apartments are arranged in vertical stack formation. In order to adequately secure the doors in closed position, the bottom wall 20 is formed with upwardly extending tabs 98 formed at their upper ends with forwardly extending projections 99, see FIGURES 1, 20 and 21. The doors are formed with apertures 103 for receiving the projections 99 which interlock snap-fashion with the doors. With this structure, the doors are held closed and in alinement, also the bottom wall 20 is maintained against the lower edges of the doors.

The main portion of the roof 33 is of pyramidal shape and a pole 100 extends upwardly from the vertex of the roof. Connecting bars 101, apertured at the ends, may be positioned on the poles 100 to serve as perches on the roof structure.

The side and rear walls 21, 22, 23, are formed with groups of apertures 105 to provide ventilation to the apartment. When the apartments are assembled to form a multiple dwelling, ventilation is further provided by the apertures resulting from the outfolding of the tabs 70. Accordingly, in a multiple dwelling arrangement, each apartment is adequately ventilated, which is necessary during periods when the ambient temperature is high.

It is believed apparent that we have produced a bird house which is particularly economical to manufacture in volume production and has the advantage of being shipped in flat collapsed form. The apartments can be quickly and conveniently erected without the use of any tools, or the employment of separate fasteners. The apartments can be quickly and conveniently assembled into multiple apartment dwellings of many different configurations.

It will also be apparent that modifications can be made without departing from the spirit of our invention. For example, the tabs 70 may be separate, double-ended tabs, and the side walls 21, 22, and rear walls 23, provided with only the apertures 71. Also, certain of the wall panels may be formed as separate pieces and joined together by the tab formations disclosed, or by other means.

What we claim is:

1. A bird house comprising an apartment of quadrangular form having a bottom wall, opposite side walls, and a rear wall, certain of said walls being joined together by an integral hinged joint, said side walls being formed with projections extending upwardly from the upper edges thereof, said bottom wall being formed with apertures spaced complemental to said projections said side wall projections on a first apartment entering the apertures in the bottom wall of similar apartment superimposed on said first apartment, said projections serving to interlock said apartments arranged in vertical stack formation, and means cooperable with said side and end walls for detachably connecting apartments together in spaced lateral relation to form a multiple apartment dwelling.

2. A bird house as set forth in claim 1, and including a roof member positioned on said side and end walls and being formed with apertures to receive said projections for detachably securing said roof member to the apartment.

3. A bird house as set forth in claim 1, wherein said rear wall is also formed with projections extending upwardly from the upper edge thereof, and said bottom wall and roof member are formed with apertures to receive said rear wall projections.

4. A bird house as defined in claim 1, and including a porch floor panel extending forwardly from the forward edge of said bottom wall.

5. A bird house as defined in claim 1, wherein said bottom wall is formed with an integral portion extending forwardly from the front edges of said side walls to form a porch area.

6. A bird house as defined in claim 1, wherein said bottom wall is formed with a forwardly extending portion providing a porch area, and a perch detachably mounted on said forwardly extending portion and extending transversely thereof.

7. A bird house as defined in claim 1, wherein said bottom wall is formed with a forwardly extending portion providing a porch area, said area being formed with tabs foldable upwardly therefrom, and a perch rail detachably connected to the ends of said tabs.

8. A bird house as defined in claim 1, wherein said side and end walls are formed with venting apertures, said apertures being located in proximity to the lower and upper edges of said walls.

9. A bird house comprising an apartment of quadrangular form having a bottom wall, opposite side walls, and a rear wall, all of said walls being of like dimension, said side and end walls being each provided in diagonal corner areas with tabs, and in opposite diagonal corner areas with tab receiving slots, the arrangement of said tabs and slots being symmetrical in all of said walls whereby, when apartments are positioned in side by side, end to end, or end to side relation, said tabs on a vertical wall of one apartment will enter the slots in the wall of the other apartment, said tabs having interlocking engagement with said slots.

10. A bird house as set forth in claim 10, wherein said tabs maintain adjacent apartments in joined spaced apart relation.

11. A bird house as set forth in claim 9, wherein said tabs are formed integral with said walls and are folded outwardly therefrom on an integral hinged joint.

12. A bird house comprising an apartment of quadrangular form having a bottom wall, opposite side walls, and a rear wall, certain of said walls being joined together by an integral hinged joint, a door defining closure wall extending between the forward edges of said side walls and means for detachably holding said door walls in closed position, said side walls being formed with tabs extending upwardly from the upper edges thereof, a roof member adapted to be positioned on said side and end walls and being formed with slots to receive said tabs, said tabs serving to detachably secure said roof member to said side walls each said door closure wall being formed with an ingress and exit opening in the outward edge portion thereof and wherein said door closure is connected by an integral hinged joint with at least one of said side walls.

13. A bird house as set forth in claim 12, wherein said bottom wall is provided with means for detachably securing said door in closed position.

14. A bird house as defined in claim 12, wherein said bottom wall is provided with upwardly extending tabs having forwardly extending projections at their upper end, said door closure being formed with slots for receiving said projections, and said projections having interlocking engagement with said door closure.

15. A bird house as defined in claim 12, wherein said bottom member and said roof member are provided with means for detachably securing said door closure in closed position.

16. A bird house as defined in claim 12, wherein said door closure consists of a pair of panels joined together at the front edges of said side walls by integral hinged joints, said panels being movable about said hinged joints in a direction transversely of said bottom wall to closed positon, and means releasably holding said panels in closed position.

17. A bird house as defined in claim 12, wherein said door closure consists of a pair of closure panels joined to the front edges of said side walls respectively, the free vertical edges of said closure panels meeting medial of said side walls and being provided with interlocking tabs for holding said panels in closed position.

18. A bird house as set forth in claim 1, wherein said bottom wall, oppoiste side walls and rear wall are of like dimensions, each of said side walls and rear wall being provided in diagonal corner areas with tabs and in opposite diagonal corner areas with tab receiving slots, the arrangement of said tabs and slots being symmetrical in said walls, whereby when apartments are positioned in side by side, end to end, or end to side relation, said tabs on a wall of one of said apartments will enter the slots in the wall of other compartments.

19. A bird house according to claim 18, wherein said tabs are formed integral with said side and rear walls.

20. An enclosure formed from a flat blank of sheet plastic material folded to provide a pair of side walls, an end wall and a bottom wall, said side and end walls being formed with integral projections at their top edges, said bottom wall having slots located complemental to and receiving said projections whereby one enclosure may be detachably affixed on top of another enclosure, each of said side walls being provided with symmetrically arranged fastening means, said fastening means on one of said side walls detachably interlocking with a complemental side wall on an adjacently positioned enclosure.

References Cited

UNITED STATES PATENTS

| | | | |
|---|---|---|---|
| 1,516,381 | 11/1924 | Erickson | 119—23 |
| 1,791,956 | 2/1931 | Cowles | 119—23 |
| 2,230,305 | 2/1941 | Mallgraff | 119—23 |
| 2,292,614 | 8/1942 | Copeman | 119—23 |
| 2,424,733 | 7/1947 | Benson | 119—23 |
| 3,078,826 | 2/1963 | Bear | 119—23 |
| 3,195,507 | 7/1965 | Miller | 119—23 |
| 3,198,172 | 8/1965 | Crane | 119—23 |
| 3,250,249 | 5/1966 | Nelson et al. | 119—23 |

ALDRICH F. MEDBERRY, Primary Examiner

U.S. Cl. X.R.

229—17